Feb. 18, 1930.  G. C. H. WICHMANN  1,747,962
PRINTING MACHINE AND PRESS
Filed March 30, 1928
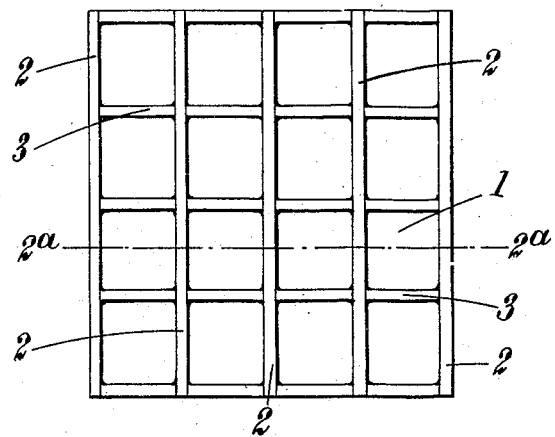
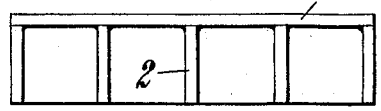
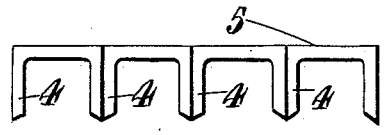
INVENTOR
Georg C. H. Wichmann
BY
Ernest Wilkinson
ATTORNEY Patented Feb. 18, 1930

1,747,962

UNITED STATES PATENT OFFICE

GEORG CARL HEINRICH WICHMANN, OF LONDON, ENGLAND

PRINTING MACHINE AND PRESS

Application filed March 30, 1928, Serial No. 265,903, and in Great Britain April 14, 1927.

The present invention relates to improvements in the beds of printing machines or presses.

Hitherto beds, platens and tables of printing machines have generally been made by casting, which involves highly skilled labour in making the patterns and assembling the mould parts, so that the cost of the finished castings is high. Further such castings are both heavy and brittle and require machining operations which greatly increase the cost.

The present invention relates to the formation of such beds by building up the same from components of rolled metal which components are united by welding. The accompanying drawings show two constructional forms of machines.

Fig. 1 is an under plan view of one form, and Fig. 2 a sectional side view thereof on the line 2a—2a. Fig. 3 is a side view of a variant form.

Referring to Figs. 1 and 2, a top plate 1 of rolled sheet steel has underneath ribs 2 of rolled sheet bar or rail, the ribs being welded to the plate, and the cross ribs 3 when present being welded to both plate and ribs.

In Fig. 3 there are shown rolled steel channel sections 4 laid alongside each other and welded together, the top plate 1 of rolled sheet steel being thus dispensed with, as the surface 5 can be trued up by a machining operation.

Local attachments or additions may be provided for accommodating various devices on the bed according to the particular type of printing machine or press to which the bed is to be applied.

One form of reciprocating bed comprises a number of channels of rolled steel or the equivalent channels, welded together to form the face of the bed, and the undersides of such channels will be welded to a series of plates of rolled steel running longitudinally of the structure in the direction of the motion of the bed, and projecting at each end for the distance necessary to give the requisite bearing on the rollers, the structure being strengthened by webs joining such projections to the sides of the extreme channels.

As an alternative to such webs tie-rods or other convenient stiffening devices can be used.

As an alternative form of reciprocating bed a continuous top plate can be used, to the underside of which are welded cross pieces, which in turn are welded to the longitudinal runners.

If desired the structure can be extended so as to include an inking plate similarly built up, the webs or other devices being at the extreme ends of such structure.

The methods of construction above described presents many advantages. The beds can be built up from rolled steel of standard types so rapidly that very little stock need be held. Some of the components may be made by press work. The cost of production is lower and further a much lighter bed can be produced. This is of great importance in machines in which the bed is a reciprocating rolling table, whose motion has to be changed at the end of each stroke, involving shock and loss of power, which are greatly diminished when a lighter bed is used.

I would have it to be understood that the term "bed" used in the claims is to be read as including "platens and tables", and the term "machine" to include "press".

What I claim is:—

1. A printing machine bed comprising a top plate component of rolled metal and underneath rolled metal sections all the components being united by welding.

2. A printing machine bed comprising rolled metal components placed in contactual relation, all of said components being united by welding to form an integral structure.

3. A printing machine bed comprising a top plate of rolled metal, and a series of sections of rolled metal mounted beneath the same to form a cellular supporting base for said plate, said plate and said sections being all secured together by welding to form an integral structure.

In testimony whereof, I affix my signature.

GEORG CARL HEINRICH WICHMANN.